April 29, 1969 C. BALDRICH 3,441,672

APPARATUS FOR PHASE CORRECTION OF PAGE PRINTERS FOR FACSIMILE RECEIVERS

Filed Sept. 1, 1965 Sheet 1 of 2

Christoph Baldrich
INVENTOR

Christoph Baldrich
INVENTOR

United States Patent Office 3,441,672

Patented Apr. 29, 1969

3,441,672

APPARATUS FOR PHASE CORRECTION OF PAGE PRINTERS FOR FACSIMILE RECEIVERS

Christoph Baldrich, Cologne-Dunnwald, Germany, assignor to Dr.-Ing Rudolf Hell Kommanditgesellschaft, Kiel-Dietrichsdorf, Germany, a German company Filed Sept. 1, 1965, Ser. No. 484,479
Claims priority, application Germany, Sept. 17, 1964, H 53,797
Int. Cl. H04l 7/00; H04n 1/04
U.S. Cl. 178—69.5 3 Claims

ABSTRACT OF THE DISCLOSURE

A device for phase correction of page printers for facsimile receivers having a measured scale arranged in front of the sheet to be recorded, the scale allowing positioning of the separating line on the recorded facsimile document to be read when phasing error occurs, a potentiometer provided with the same scale division, the slider of the potentiometer adjustable according to the position read on the first scale, a monostable switch the reversion time of which is adjustable by means of the potentiometer, the switch selectively actuatable to stop a source of printing pulses and thereafter release the pulses after the elapse of an adjusted reversion time sufficient to overcome the phasing error and re-align the print's position.

Figure 1:
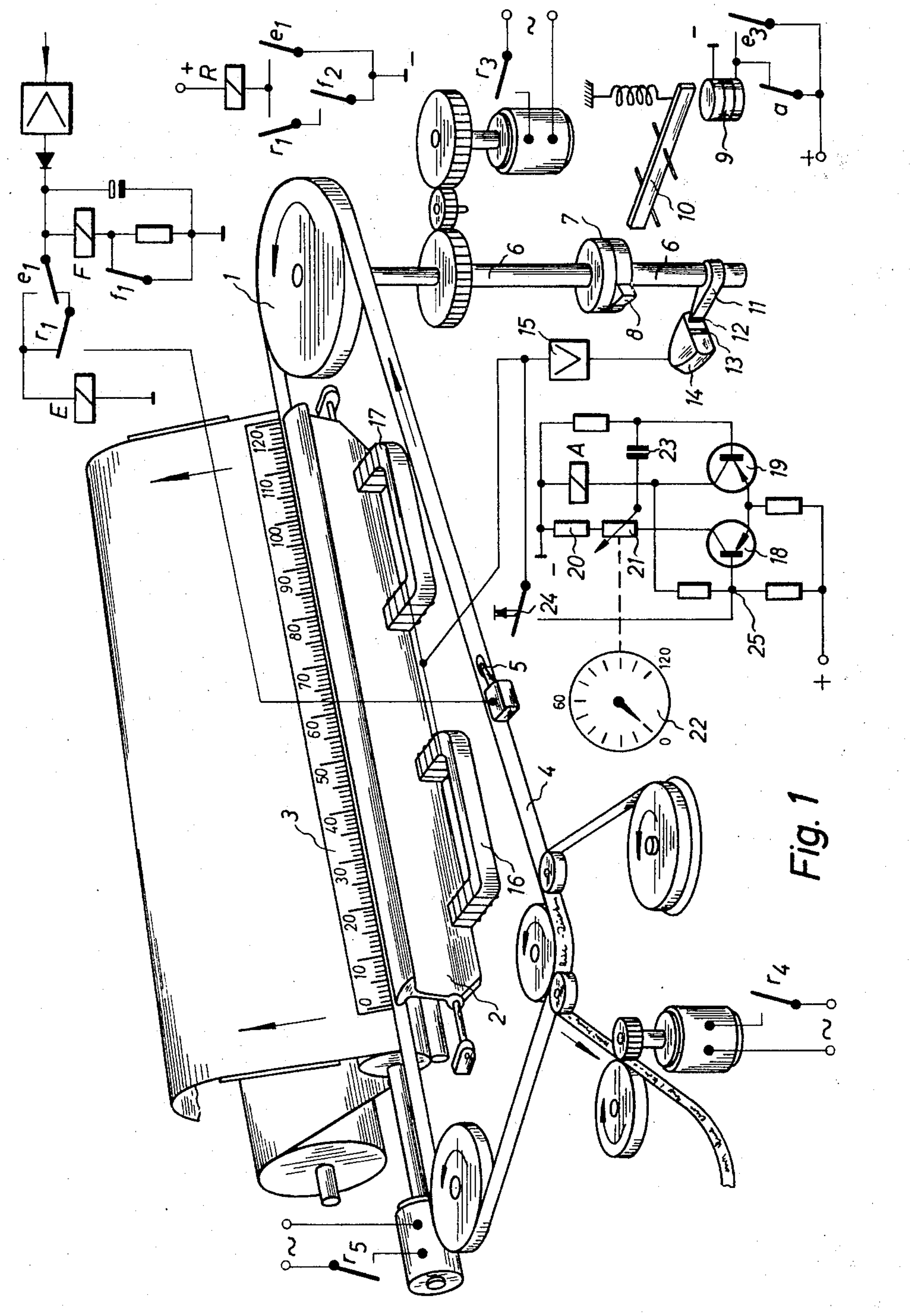

This invention relates to apparatus for phase correction of page printers for facsimile receivers.

In our prior Patent No. 2,853,551 granted on Sept. 23, 1958, a page printer for facsimile receivers has been described using an endless tape operating as an intermediate record carrier, a record receiving sheet, means for moving said intermediate record carriers, means for moving said record-receiving sheet in a direction perpendicular to the direction of motion of said intermediate record carrier, operating means for continuously successively recording in color upon said intermediate record carrier symbol elements, corresponding to incoming signals received from a transmitter and belonging to successive lines of symbols to be recorded upon said record-receiving sheet, a printing mechanism, control means for periodically actuating said printing mechanism for the purpose of simultaneously printing on said record-receiving sheet groups of symbol elements recorded upon said intermediate record carrier and belonging respectively to successive lines, and means for cancelling symbol elements recorded upon said intermediate record carrier after printing thereof line for line on said record-receiving sheet.

The regular operation of this page printer requires that, before the commencement of the reception of a message, the moments of release of the pulses for the printing mechanism are brought into the correct phase position, so that the printing mechanism is periodically operated each time when the beginning or the end of a line, recorded on the rotating strip, has just arrived at the left or the right end of the printing bar. This happens with the embodiment according to our above mentioned prior patent in such a way that the uniform motion of a rotating cam is derived from the drive of the uniform motion of the circulating strip, which cam closes at each revolution a stationary contact, or—in another embodiment—induces a voltage pulse in a pick-up head, whereby a circuit incorporating an electromagnet is closed, said electromagnet suddenly turning the printing bar arranged to be rotatable in springy fashion around a longitudinal axis in such a way that the part of the bar facing the circulating strip, urges a section of the strip corresponding in length to one line, against the recording sheet, thus effecting a print of the recording of this section on the sheet.

The shaft driving the rotating cam is interrupted by a friction clutch, the half of which facing the cam has a locking pawl on its circumference, in which pawl an electromagnetically operated locking lever can engage. The driving motor is switched in, and the locking lever is brought into the path of the locking pawl by the starting signal emitted by the transmitter. The locking pawl of the one half of the friction clutch runs against the locking lever whereby the cam is fixed in a defined initial position which is the phase position.

After the starting signal has been terminated, the locking pawl momentarily releases the cam which is now driven by the permanently rotating other half of the friction clutch. In this way, the page printer is phased.

Now, the pulse production for the periodical operation of the printing bar needs not be electromechanically derived from the drive of the circulating strip as described in our prior patent. In an embodiment of a new arrangement, the pulses are derived from the alternating current supply feeding the page printer. This is effected by transforming the periods of the A.C. into square pulses of equal polarity by means of a trigger. These pulses at the supply frequency of 50 c./s. control, via a normally opened gate, an electronic counter with a counting period of 25 steps. After each 25th counting step the counter releases one pulse which, after amplification, energizes the electromagnets for the printing bar, twice per second.

On commencement of the starting signal, a phase emitter is started which blocks the gate for the duration of the starting signal so that no counting pulses can reach the counter, and this forces the counter into a predetermined initial position which is the phase position. After the termination of the starting signal, the phase emitter momentarily releases the gate so that the counter begins to count from its initial position. In this way, the page printer is phased.

These known phasing apparatus work satisfactorily provided that the starting signal is regularly transmitted. However, it may happen, by the occurrence of disturbing pulses in the transmitting path (picture line, radio channel), that the start of the receiver correctly takes place, but the phasing fails. This can be recognized on the page printer according to our prior patent by the fact that a separating line running vertically to the printing bar, arises anywhere between the left and the right recording border of the recorded facsimile document which is separated by said line into two incoherent parts. If one visualizes the document cut along this separating line and the right border of the right part connected with the left border of the left part, or vice versa, and in addition, if one imagines that the two parts be mutually displaced in height by the thickness of a recording line, then the document becomes coherent.

Hitherto, a later phase correction with the working receiver was achieved by means of a differential gear which was inserted into the shaft driving the cam, and which allowed an angular displacement of any amount of the cam in relation to its driving shaft. The differential gear is so adjusted by several trials that the separating line travels over the shortest path to the one border of the facsimile document. This procedure requires about the time of the recording of 20–40 lines, i.e., since the recording speed is about two lines per second, 10–20 seconds. With an assumed line distance of about 0.2 mm. (line density 5/mm.), this time corresponds to a recorded picture height of about 4–8 mm. Since this loss of picture appears too great, a reduction of the time required for the phase correction is needed, so that the correction can be achieved within the time required for the recording of one or two lines.

According to the invention, the phase correction is achieved by means of apparatus comprising a scale of line length arranged in front of the sheet to be recorded, said scale allowing the position of the separating line to be read on the recorded facsimile document when error phasing occurs, a potentiometer provided with the same scale division as said scale, the idler of said potentiometer being adjustable according to the mark read on said first scale, a monostable switch, the reversion time of which is adjustable by means of said potentiometer, said switch, after the depression of a key, stopping the device (cam switch, counter) which periodically produces the printing pulses, and releasing said pulses after the elapse of said adjusted reversion time, said time corresponding to the read position of said separating line.

Figure 2:
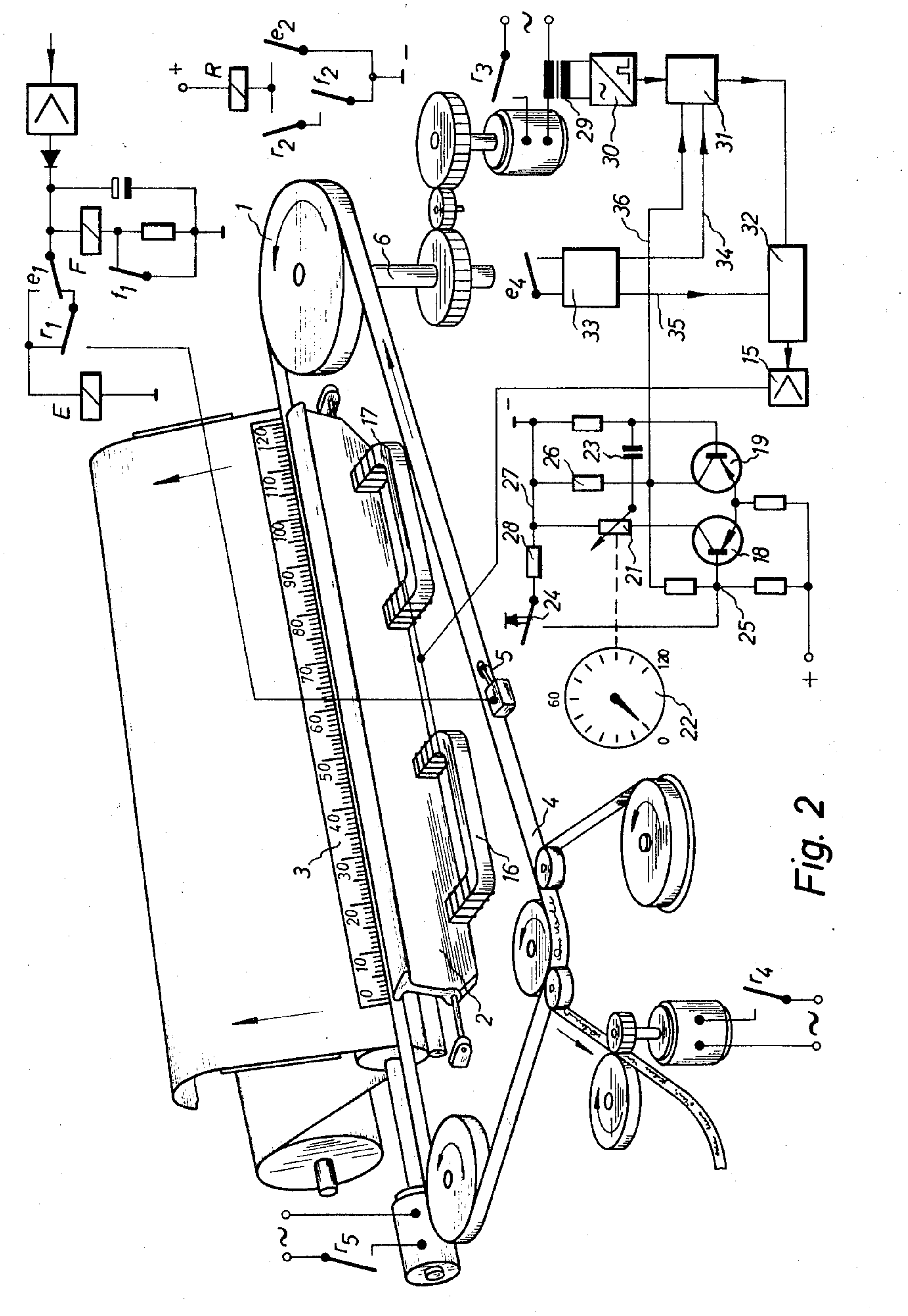

In order that the invention may be more clearly understood, reference will now be made to the accompanying drawings which show by way of example two embodiments thereof, and in which:

FIGURE 1 shows a facsimile page printer provided with the circulating strip serving as an intermediate recording carrier, the pulse production for the printing mechanism to be periodically operated being electromechanically derived from the drive of the rotating strip, together with an apparatus for the correction of error phasing, and FIGURE 2 shows such a page printer, the impulse production for the printing mechanism being electrically derived from the A.C. supply to the equipment, together with a modification of the apparatus for the correction of error phasings.

As to the method of operation of the page printer itself, reference should be made to our prior patent.

The parts in the drawings relating to the actual page printer and the receiver circuit do not exactly agree with the drawings of our prior patent, but have been amended.

Referring now to FIGURE 1, the phasing process will firstly be more closely discussed for a better understanding of the phase correction apparatus.

The circumference of the strip transporting pulley 1 is equal to the length of a recording line which is equal to the length of the printing bar 2. The latter is again equal to the length of the reading scale 3 numbered from 0–120 and arranged above the printing bar 2. If the pulley 1 makes one complete revolution, the circulating endless strip 4, serving as intermediate recording carrier, is transported for exactly one line length. The length of the strip section between the recording system 5 and the left end of the printing bar 2—measured in the direction of the arrow—is, by reason of design, a certain not whole-numbered multiple of the line length. If the beginning of a line is just being recorded by the recording system 5 at the recording location, the printing of said line on the sheet by means of the printing bar 2 has to take place at the actual moment when the beginning of the line on the strip 4 has arrived at the left end of the printing bar 2 at the scale mark 0. This requires a time interval which is equal to the above mentioned not whole-numbered multiple of the printing period, the latter being the time interval that the strip needs to move the line length, and, after the elapse of which, the printing mechanism is operated each time.

The shaft 6 for the strip transporting pulley 1 is interrupted by the friction clutch 7. The lower half of said friction clutch has the locking pawl 8 into the path of which the locking lever 10 operated by the electromagnet 9, can be brought. The cam 11 is attached to the lower end of the shaft 6, said cam 11 having the small permanent magnet 12 at its pointed end. With every revolution of the cam 11, the magnet 12 induces, during sweeping the air gap 13 of the pick-up head 14, a voltage pulse in the coil of said pick-up head, said pulse, after amplification in the amplifier 15, energizing two magnets 16 and 17 of the printing bar 2 each time for a short time, said magnets suddenly giving the printing bar 2 an angular momentum.

The angular distance between the cam 11 in its phase position in which said cam is fixed when the locking pawl 8 runs against the locking lever 10, and the air gap 13 of the pick-up head 14—measured in the direction of rotation—is so selected that, after the beginning of the reception of a transmission, the printing bar 2 is operated the first time when the strip 4 has moved a distance which is equal to the remainder resulting from the division of the strip length between the recording system 5 and the left end of the printing bar 2, by the line length. At the beginning of a recording, the printing bar 2 is at least operated once idly before the beginning of the recording of the first line has reached the left end of the printing bar 2. The number of idle operations depends upon the above-mentioned strip length and is equal to the whole-numbered quotient from the length of the strip and the recording line without considering the remainder resulting from the division.

If a phasing has failed, the correction of the error phasing depends on the time moments of release of the pulses for the printing bar being shifted once a certain amount which is at most equal to the printing period. For this purpose a monostable switch with adjustable reversion time is provided, said switch being composed mainly of the two transistors 18 and 19 in the known multivibrator circuit. In the collector circuit of the transistor 18, there is the fixed resistor 20 in series with the variable resistor of the potentiometer 21 the slide of which has the circular scale 22 which has the same division as the reading scale 3. The resistors 20 and 21, together with the capacitor 23, form a RC-member with adjustable time constant. In the collector circuit of the transistor 19 there is the relay A which is energized in its rest position, i.e. when the transistor 19 is conductive. The relay A has the working contact *a* which is connected in parallel to the contact $e_3$ of the receiving relay E in the circuit of the phasing magnet 9. The correction of the error phasing takes place as follows:

If it is stated, after the recording of some lines, that a separating line occurs anywhere between the marks 0 and 120 of the reading scale 3, e.g. at the mark 70, the slide of the potentiometer 21 is set to the mark 70 on the scale 22. The reversion time of the multivibrator switch is adjusted herewith, i.e. the time constant of its RC-member, said time constant being composed of two time amounts. The invariable resistance of the resistor 20 corresponds to the constant time that the rotating cam 11 needs to pass the angle (measured in the direction of the arrow) between the air gap 13 of the pick-up head 14 and the phase position of the cam in which the locking pawl 8 is fixed by the locking lever 10. The adjusted variable resistance of the potentiometer 21 corresponds to the variable time that the cam 11 remains in this phasing position. This time is equal to the time which the strip 4 needs to run from the mark 70 to the mark 0 (measured in the direction of the arrow).

After the slide of the potentiometer 21 has been set on the scale 22, the key 24 is depressed for about one second. Therewith the next printing pulse induced in the pick-up head 14 by means of the magnet 12 of the cam 11, reaches, via the amplifier 15 and the key 24, the input, at point 25, of the monostable switch. The latter reverses, i.e. the transistor 19 is blocked, the relay A is de-energized, and the transistor 18 becomes conductive, i.e. the current is now flowing through the resistors 20 and 21, and the capacitor 23 is being charged. The contact *a* of the relay A previously opened, closes, the phasing magnet 9 is energized, the locking lever 10 gets in the path of the cam 8 which runs against the locking lever 10 and is retained in its phasing position. After the elapse of the set reversion time, the multivibrator switch automatically flips back into its rest position, i.e. the transistor 18 is blocked, the transistor 19 becomes conductive, the relay A is energized, the contact $a$ is opened, the phasing magnet 9 is de-energized, and the locking lever 10 releases the locking pawl 8, thus causing the cam 11 to rotate. In this way, the next printing pulse and all further printing pulses have been retarded the time corresponding to the adjustment of the resistance of the potentiometer 21 as against the last printing pulse. During this time the strip 4 has moved the distance between the mark 70 and the mark 0, and thus the error phasing is corrected.

Referring now to FIGURE 2, the apparatus represented in this drawing works according to the same principle as in FIGURE 1. Corresponding parts have the same reference numerals as in FIGURE 1. In contradistinction to FIGURE 1, however, the friction clutch 7, the cam 11, the pick-up head 14, the locking lever 10 and the phasing magnet 9, and further the contacts $a$ and $e_3$ are not present in FIGURE 2. The resistor 20 in the collector circuit of the transistor 18 and the relay A in the collector circuit of the transistor 19 of the monostable switch are also not present, and the relay A is replaced by the resistor 26. Furthermore, the key 24, when depressed, does not connect the amplifier 15, but in its place, the conductor 27 via the resistor 28 with the input of the monostable switch, at point 25. Now, said switch is reversed not by a pulse arising externally, but by depressing the key 24. The printing pulses are not derived from a rotating part of the equipment, but from the A.C. supply. The supply voltage is transformed down in a transformer 29 and fed to the trigger 30 which converts the A.C. periods into square pulses of equal polarity. With the usual supply frequency of 50 c./s., 50 trigger pulses per second result. Via the And-Gate 31 which is normally open, the pulses reach the electronic counter 32 which has a counting period of 25 steps. After each 25th counting step, i.e. after each half second, the counter releases a pulse which, after amplification in the amplifier 15, is fed to the coils of the magnets 16 and 17 of the printing bar 2.

The phasing is achieved by means of the phase emitter 33. When the receiving relay E is energized by the beginning of the received starting signal, the rest contact $e_4$ of the phase emitter 33 closes. It feeds a blocking voltage via the conductor 34 during the starting signal to the one control input of the gate 31 which keeps the trigger pulses away from the counter 32. The counter 32 is forced into a defined constant initial position by a pulse, via the conductor 35, said position, however, being different from its zero position. This initial position is so selected that the remainder of the counting period remaining to the 25th counting step—the counting period being equal to the printing period—is, except for whole-numbered multiples of the counting period, equal to the time that the strip 4 requires to move from the recording system 5 to the left edge of the printing bar 2 (mark 0). After the termination of the starting signal, the relay E is de-energized, and the contact $e_4$ is opened, the phase emitter 33 releases the gate 31, and the counter 32 momentarily begins to count starting from its initial position. If an error in phasing occurs, the position of the separating line read on the scale 3, is transferred to the adjustment of the slide of the potentiometer 21 on the scale 22, and the key 24 is depressed. Voltage is fed via the conductor 27 and the resistor 28 to the input, at point 25, of the monostable switch which reverses in the way already described. A potential arises in the conductor 36 by the blocking of the transistor 19, said potential being fed to the second control input of the gate 31 which is blocked. No further counting pulses reach the counter 32 which stops. After the reversion time, adjusted on the scale 22 of the potentiometer 21, has elapsed, said reversion time being equal to the time that the strip 4 requires to move the distance separating line—mark 0 on the scale 3, the switch automatically reverses into its stable position. The blocking potential in the conductor 36 disappears, and the gate 31 is opened. The counter 32 continues to count from the position where it was stopped. Therewith the error phasing is corrected.

Changes and modifications may be made within the spirit and scope of the appended claims.

What I claim is:

1. Apparatus for phase correction of page printers for facsimile receivers using an endless tape operating as an intermediate record carrier, a record receiving sheet, means for moving said intermediate record carrier, means for moving said record-receiving sheet in a direction perpendicular to the direction of motion of said intermediate record carrier, operating means for continuously successively recording in color upon said intermediate record carrier symbol elements, corresponding to incoming signals received from a transmitter and belonging to successive lines of symbols to be recorded upon said record-receiving sheet, a printing mechanism, control means for periodically actuating said printing mechanism for the purpose of simultaneously printing on said record-receiving sheet groups of symbol elements recorded upon said intermediate record carrier and belonging respectively to successive lines, and means for cancelling symbol elements recorded upon said intermediate record carrier after printing thereof line for line on said record-receiving sheet, comprising a scale of line length arranged in front of the sheet to be recorded, said scale allowing the position of the separating line on the recorded facsimile document to be read when error phasing occurs, a potentiometer provided with the same scale division as said scale, the slider of said potentiometer being adjustable according to the mark read on said first scale, a monostable switch, the reversion time of which is adjustable by means of said potentiometer, a key switch operatively associated with said switch, said switch, after depression of said key, stopping the device which periodically produces the printing pulses, and releasing said pulses after the elapse of said adjusted reversion time, said time corresponding to the read position of said separating line.

2. Apparatus as claimed in claim 1, wherein the device which periodically produces the printing pulses comprises a rotating cam switch which periodically closes and opens a contact.

3. Apparatus as claimed in claim 1, wherein the device which periodically produces the printing pulses comprises a periodical counter driven by the A.C. supply feeding said apparatus, the counting period of said counter being equal to the printing period.

References Cited

UNITED STATES PATENTS 2,853,551 9/1958 Hell ---------------- 178—11

ROBERT L. GRIFFIN, *Primary Examiner.*

ROBERT L. RICHARDSON, *Assistant Examiner.*

U.S. Cl. X.R.

178—11